(12) United States Patent
Fernandez et al.

(10) Patent No.: US 7,721,694 B2
(45) Date of Patent: May 25, 2010

(54) LOCK PIN RETENTION PLUG FOR A TWO-STEP ROCKER ARM ASSEMBLY

(75) Inventors: Hermes A. Fernandez, Pittsford, NY (US); Albert C. Stone, Grandville, MI (US)

(73) Assignee: Delphi Technologies, Inc., Troy, MI (US)

( * ) Notice: Subject to any disclaimer, the term of this patent is extended or adjusted under 35 U.S.C. 154(b) by 290 days.

(21) Appl. No.: 11/490,370

(22) Filed: Jul. 20, 2006

(65) Prior Publication Data

US 2008/0017152 A1  Jan. 24, 2008

(51) Int. Cl.
*F01L 1/18* (2006.01)

(52) U.S. Cl. .............. 123/90.39; 123/90.16; 123/90.44

(58) Field of Classification Search ............. 123/90.39, 123/90.16, 90.44
See application file for complete search history.

(56) References Cited

U.S. PATENT DOCUMENTS

| | | | |
|---|---|---|---|
| 3,525,453 A | 8/1970 | Leighton | |
| 5,544,626 A | 8/1996 | Diggs et al. | |
| 5,853,093 A * | 12/1998 | Neiger | 215/237 |
| 6,497,207 B2 | 12/2002 | Spath et al. | |
| 6,615,782 B1 | 9/2003 | Hendriksma et al. | |
| 6,640,759 B1 | 11/2003 | Hendriksma | |
| 6,668,775 B2 | 12/2003 | Harris | |
| 6,668,779 B2 | 12/2003 | Hendriksma et al. | |
| 6,691,657 B2 | 2/2004 | Hendriksma et al. | |
| 6,883,478 B2 | 4/2005 | Borraccia et al. | |
| 6,925,978 B1 | 8/2005 | Gerzseny et al. | |
| 6,966,291 B1 | 11/2005 | Fischer et al. | |
| 6,997,152 B2 | 2/2006 | Harris | |
| 2005/0164079 A1 * | 7/2005 | Kim | 429/174 |

FOREIGN PATENT DOCUMENTS

| | | |
|---|---|---|
| DE | 538132 | 11/1931 |
| EP | 0443720 | 8/1991 |

* cited by examiner

*Primary Examiner*—Zelalem Eshele
(74) *Attorney, Agent, or Firm*—Thomas N. Twomey

(57) ABSTRACT

A lock pin bore in a two-step rocker arm assembly contains a hydraulically-actuable lock pin. A return spring urges the lock pin toward an unlatched mode. The bore has one or more annular grooves formed near the outer end of the bore. A plug, formed preferably of a soft metal, is pressed as a hydraulic seal into the bore. During assembly, the final position of the lock pin within the bore is set by positioning a stopping assembly fixture into the locking end of the bore. The plug is pressed into the bore until contact is made with the lock pin and the lock pin engages the fixture. The plug is radially deformed into the annular groove(s) to anchor the plug and fix the outer limit of travel of the locking pin and the compressive load on the return spring.

13 Claims, 3 Drawing Sheets

LOCK PIN RETENTION PLUG FOR A TWO-STEP ROCKER ARM ASSEMBLY

TECHNICAL FIELD

The present invention relates to mechanisms for altering the actuation of valves in internal combustion engines; more particularly, to finger follower type rocker arm assemblies having means for changing between high and low or no valve lifts; and most particularly, to a two-step finger follower type rocker arm assembly having a deformable lock pin retention plug retained by grooves in the lock pin bore.

BACKGROUND OF THE INVENTION

Variable valve activation (VVA) mechanisms for internal combustion engines are well known. It is known to be desirable to lower the lift, or even to provide no lift at all, of one or more valves of a multiple-cylinder engine, during periods of light engine load. Such deactivation or cam profile switching can substantially improve fuel efficiency.

Various approaches are known in the prior art for changing the lift of valves in a running engine. One known approach is to provide a latching mechanism in the hydraulic lash adjuster (HLA) pivot end of a rocker arm cam follower, opposite from the valve-actuating end, which locks and unlocks the valve actuator portion from the follower body. The cam follower mechanism is latchable by a lock pin whose motion typically is governed in a latching direction by application of pressurized engine oil and in an unlatching direction by a return spring. The lock pin is disposed as a piston in a smooth bore and is retained therein by a plug pressed into the end of the bore.

A prior art cylindrical plug serves to seal the prior art smooth bore, thus forming a hydraulic chamber between itself and an end of the lock pin. However, this prior art plug arrangement suffers from at least two shortcomings.

First, the axial rest position of the lock pin within the bore is not well defined by the manufacturing process because the distance from the inner end of the plug to the cam-actuated follower to be latched by the lock pin is not controlled. Further, and because of this, the installed compression of the return spring is not controlled, resulting in variability in required oil pressure for actuation among the population of rocker arm assemblies.

Second, two-step rocker arm assemblies are known to experience variation in actuation timing which can result in violent rejection of the lock pin when the lock pin is not fully engaged with the cam-actuated follower at the start of a lift event. Such rejection is known in the trade as a premature lock pin ejection. Such ejection can cause an instantaneous buildup in hydraulic pressure against the plug as the lock pin direction of travel is abruptly reversed, which can be sufficient to blow the plug from the bore, resulting in permanent failure of the rocker arm assembly (permanent lost motion of the rocker arm assembly and non-opening of the associated engine valve).

Third, some prior art two-step rocker arm assemblies include a retaining ring within the bore and the hydraulic chamber specifically to define the intended stroke length of the lock pin, which adds to the cost and complexity of manufacturing the rocker arm assembly.

What is needed in the art is an improved method and apparatus for forming a lock pin sub-assembly for a two-step rocker arm assembly wherein a bore plug cannot be blown out by a premature lock pin rejection; wherein a reliable hydraulic seal of the lock pin bore is formed; and wherein the position of the lock pin in its bore and the consequent compression of a return spring are fixed and controlled to a predetermined standard during manufacture of the rocker arm assembly.

It is a principal object of the present invention to provide a two-step rocker arm assembly having a highly precise response characteristic among members of a manufactured population of two-step rocker arm assemblies.

It is a further object of the invention to provide a simplified variable valve lift apparatus wherein manufacturing assembly is simplified and cost is reduced.

It is a still further object of the present invention to provide a two-step rocker arm assembly wherein a bore-sealing plug of a lock pin assembly cannot be expelled from the bore by a premature lock pin ejection of the rocker arm assembly during use.

SUMMARY OF THE INVENTION

Briefly described, a lock pin bore in a two-step rocker arm assembly contains a lock pin and a return spring for urging the lock pin toward an outer and open end of the bore away from latching engagement. The bore is provided with at least one annular groove formed in the wall of the bore between the outer end of the lock pin and the outer end of the bore. A plug, formed preferably of a soft metal, is pressed into the bore to seal the hydraulic chamber. During assembly, the preferred final axial position of the lock pin within the bore is set by positioning a removable stopping assembly fixture into the locking end of the bore. The plug is then pressed into the bore until deforming contact is made with the lock pin. The pressing force deforms the soft plug radially into the annular groove(s) and also fixes the outer limit of travel of the locking pin in operation of the rocker arm assembly, thus fixing the limit of travel of the return spring. The deformed plug is firmly engaged by the annular groove(s) and can withstand pressures generated in the bore by premature ejections of the lock pin.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

The advantages and benefits afforded to a two-step roller finger follower in accordance with the invention may be better appreciated by first considering a prior art two-step roller finger follower.

Figure 1:
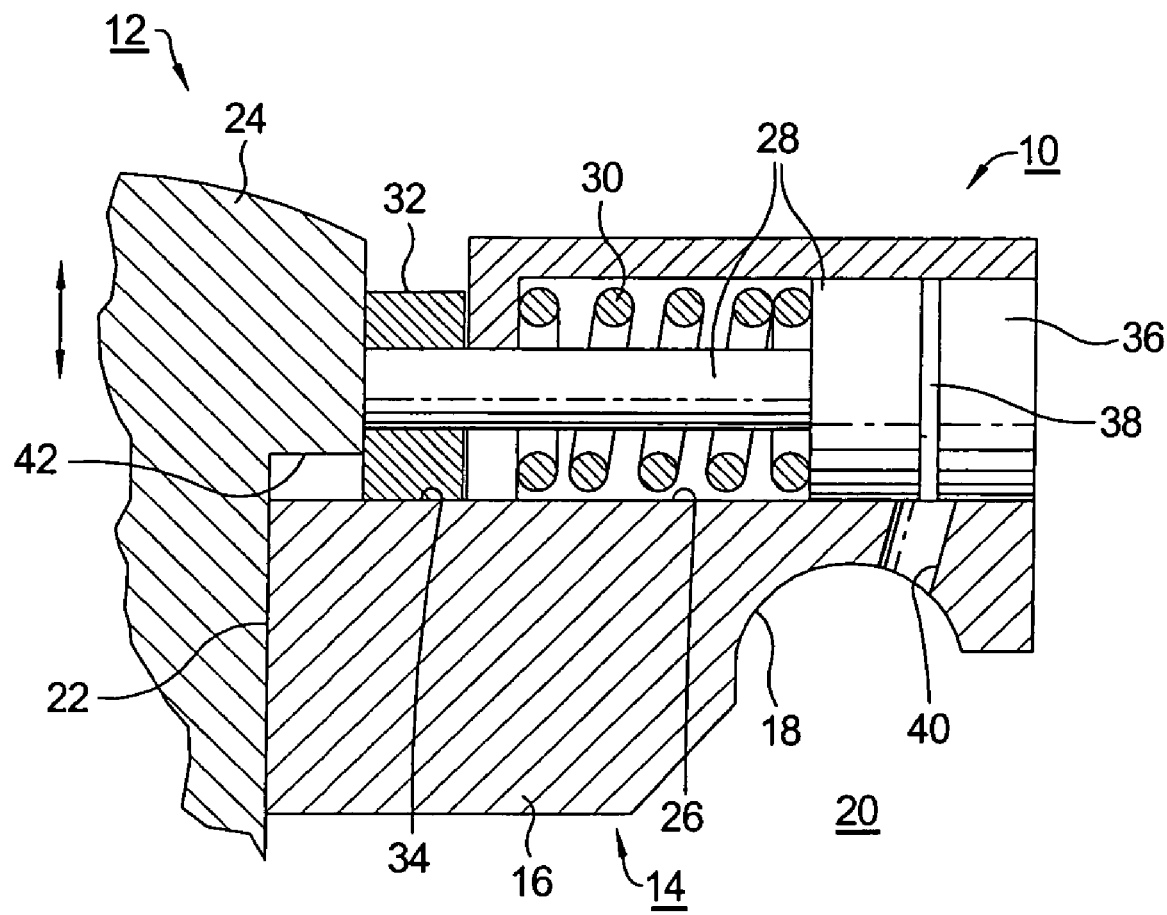
FIG. 1 is an elevational cross-sectional view of a portion of a prior art two-step finger follower rocker arm assembly.

Referring to FIG. 1, a latching mechanism 10 of a prior art two-step finger follower rocker arm assembly 12, substantially as disclosed in U.S. Pat. No. 6,615,782, includes a follower body 14 having a first end 16 having socket 18 for receiving the head of a hydraulic lash adjuster (not shown) for pivotably mounting rocker arm assembly 12 in an engine 20. Body 14 is provided with a passage 22 therethrough for slidably receiving a slider member 24. Latching mechanism 10 is provided for engaging and locking slider member 24 at its most outward extreme of motion in passage 22.

Mechanism 10 comprises a stepped bore 26, preferably cylindrical, in body 14. Latching mechanism 10 includes a piston 28 defining a locking pin biased outwards in bore 26 by a return spring 30 and extending toward slider member 24 to support a latch member 32 which may slide along a slide surface 34 in body 14. Bore 26 is closed by a plug 36, forming a hydraulic chamber 38 in communication via passage 40 with socket 18. Pressurized oil is supplied to chamber 38 in known fashion from the hydraulic lash adjuster upon command from an engine control module to cause piston 28 to become hydraulically biased toward slider member 24. When such biasing occurs and overcomes the counter-bias of return spring 30, latch member 32 is urged axially into latching and locking engagement with latching surface 42.

When the engine control module determines, in known fashion from various engine operating parameters, that a low-lift condition is desired, oil pressure is no longer supplied to chamber 38, allowing return spring 30 to again bias piston 28 and associated latch member 32 away from slider member 24, and slider member 24 is again free to slide in passage 22. As long as oil pressure is withheld from chamber 38, latching mechanism 10 remains disengaged from slider member 24, and assembly 12 functions as a low-lift rocker.

Figure 2:
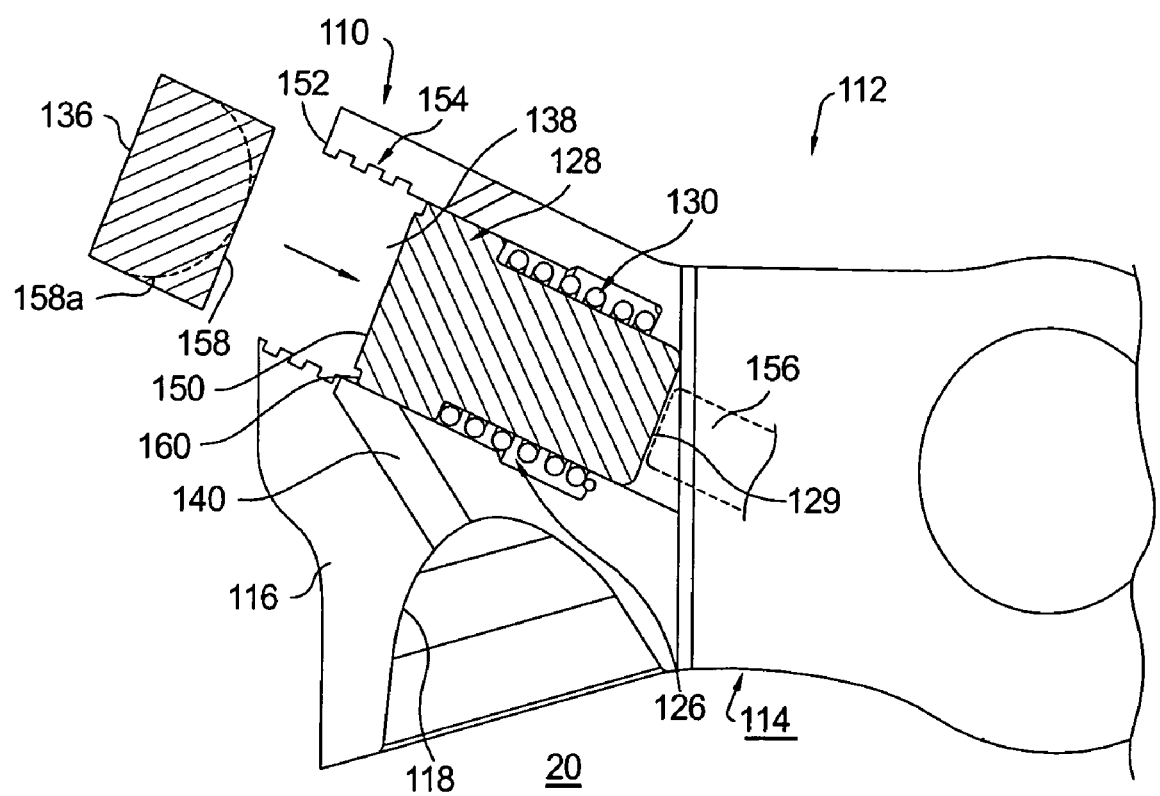
FIG. 2 is an elevational cross-sectional view of a portion of a first embodiment of two-step finger follower rocker arm assembly in accordance with the invention.
Figure 3:
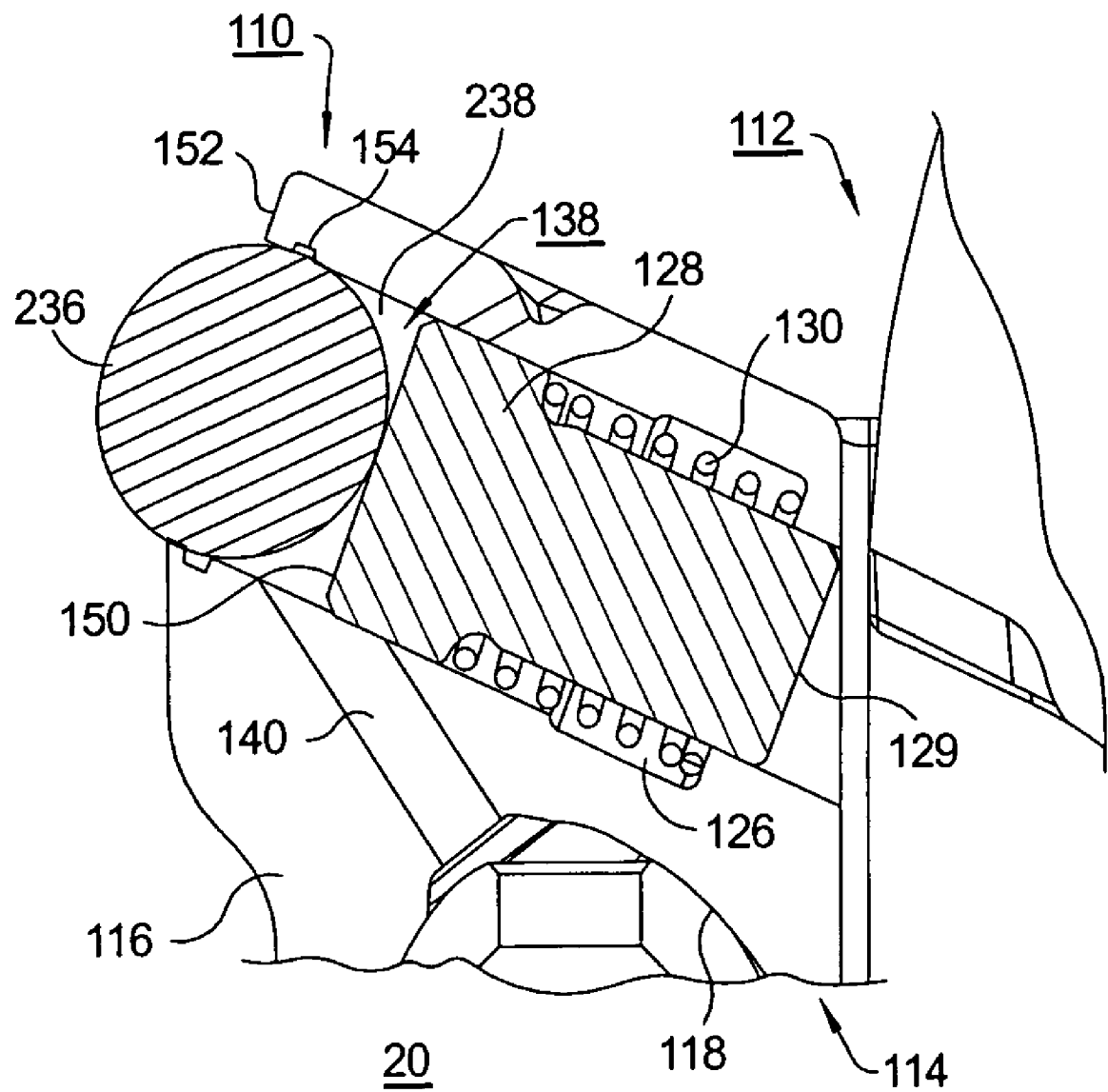
FIG. 3 is an elevational cross-sectional view of a portion of a second embodiment of two-step finger follower rocker arm assembly in accordance with the invention.

Referring now to FIGS. 2 and 3, a first embodiment of a two-step finger follower rocker arm assembly 112 improved in accordance with the invention includes a follower body 114 having a first end 116 having socket 118 for receiving the head of a hydraulic lash adjuster (not shown) for pivotably mounting rocker arm assembly 112 in an engine 20. Latching mechanism 110 is provided for engaging and locking a cam-actuated slider member (not visible in FIG. 2 but analogous to prior art member 24, shown in FIG. 1) at its most outward extreme of motion. Mechanism 110 comprises a stepped bore 126, preferably cylindrical, in body 114.

Latching mechanism 110 includes a stepped lock pin 128 defining a lock pin biased outwards in bore 126 by a return spring 130 and having an inner end 129. Bore 126 is closed by a plug 136, forming a hydraulic chamber 138 in communication via passage 140 with socket 118.

In operation, pressurized oil is supplied to chamber 138 in known fashion from the hydraulic lash adjuster upon command from an engine control module to cause lock pin 128 to become hydraulically biased toward the slider member. When such biasing occurs and overcomes the counter-bias of return spring 130, inner end 129 is urged axially into latching and locking engagement with the slider member.

When the engine control module determines, in known fashion from various engine operating parameters, that a low-lift condition is desired, oil pressure is no longer supplied to chamber 138, allowing return spring 130 to again bias lock pin 128 away from the slider member. As long as oil pressure is withheld from chamber 138, latching mechanism 110 remains disengaged from the slider member, and assembly 112 functions as a low-lift rocker.

Between the outer end 150 of lock pin 128 and the outer end 152 of bore 138, at least one formed indentation such as annular groove 154, and preferably a plurality of grooves, is provided in the wall of bore 126 for receiving material deformed from plug 136 when plug 136 is inserted into bore 126 as described below.

Plug 136 is preferably formed of a relatively soft and malleable metal such as aluminum, lead, tin, or alloys thereof, although various polymers also may be suitable in some applications.

In a preferred method for assembling a lock pin latching mechanism in accordance with the invention, a removable positioning stop 156 is disposed accurately at a predetermined location within bore 126. Spring 130 and lock pin 128 are then loaded into bore 126 through open outer end 152 with inner end 129 of lock pin 128 resting near but not against removable stop 156, being held apart therefrom by the uncompressed length of spring 130. Plug 136, having an outer diameter substantially equal to the diameter of bore 126, is pressed into the open outer end 152 of bore 126. Pressing of plug 136 into bore 126 continues as plug face 158 makes contact with end 150 of lock pin 128 and drives inner end 129 of lock pin 128 against stop 156, thereby fixing lock pin 128 in a desired axial location within bore 126 and setting the compressive load of spring 130. Continued pressing of plug 136 after lock pin 128 is arrested by stop 156 causes radial deformation of plug 136 into grooves 154 which thereby prevents any retreat of plug 136 from its pressed position and also serves to ensure a hydraulic seal of plug 136 within bore 126. Assembly stop 156 is then withdrawn, leaving plug 136 properly positioned axially within bore 126 by being pressed against plug face 158 by spring 130.

Note that when plug face 158 and outer end 150 of lock pin 128 are both planar, as shown in FIG. 2, the resulting hydraulic chamber 138 has zero volume. Therefore, outer end 150 preferably is provided with an annular recess 160 that overlaps passage 140 and permits an opening force to build up against outer end 150 of lock pin 128 to cause initial pin movement, exposing the full area of outer end 150 to hydraulic pressure.

In an alternative embodiment, the plug face may be curved, for example, hemispherical, shown as plug face 158a in FIG. 2, or the plug may simply be a ball 236 as shown in FIG. 3, thus automatically creating an annular base volume 238 for chamber 138 and obviating the need for annular recess 160, thereby reducing the manufacturing cost of assembly 112.

While the invention has been described as relating to a two-step rocker arm assembly, it is understood that it can relate to a deactivating rocker arm assembly whereby, instead of a lower valve lift, a no valve lift is applied.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A two-step finger follower rocker arm assembly for variably activating a compression valve in an internal combustion engine, comprising:
   a) a rocker arm body having a bore; and
   b) a latch disposed in said bore for selectively latching a slider member to said body to provide a first rocker assembly mode having a first valve lift capability, and for unlatching said slider member from said body to provide a second rocker assembly mode having a second valve lift capability,
   wherein said latch includes a lock pin disposed in said bore and a plug sealingly disposed in said bore to create a hydraulic chamber between said lock pin and said plug, wherein said bore is provided with at least one formed indentation, and wherein said plug in a pre-inserted condition has an outer diameter that is substantially equal to a diameter of said bore, and wherein said plug in a deformed condition is deformed radially outward relative to said plug in said pre-inserted condition into said at least one formed indentation to anchor said plug in said bore.

2. A rocker arm assembly in accordance with claim 1 wherein said plug is formed of a malleable material.

3. A rocker arm assembly in accordance with claim 2 wherein said malleable material is selected from the group consisting of aluminum, lead, tin, and alloys thereof.

4. A rocker arm assembly in accordance with claim 1 wherein said at least one formed indentation is an annular groove and wherein said plug is deformed into said annular groove.

5. A rocker arm assembly in accordance with claim 1 wherein said at least one formed indentation is a plurality of annular grooves, and wherein said plug is deformed into said plurality of annular grooves.

6. A rocker arm assembly in accordance with claim 1 wherein said plug includes a face for making contact with said lock pin, and wherein said face has a shape selected from the group consisting of planar and curved.

7. A rocker arm assembly in accordance with claim 6 wherein said curved face is spherical.

8. A rocker arm assembly in accordance with claim 6 wherein said plug is a sphere.

9. A rocker arm assembly in accordance with claim 1 further including a return spring disposed between said lock pin and said body, wherein said plug is positioned within said bore at a predetermined axial location such that an inner face of said plug provides a predetermined stop for the outward stroke of said lock pin and provides a predetermined compression of said return spring.

10. A two-step finger follower rocker arm assembly for variably activating a compression valve in an internal combustion engine, comprising:

a) a rocker arm body having a bore;

b) a latch disposed in said bore for selectively latching a slider member to said body to provide a first rocker assembly mode having a first valve lift capability, and for unlatching said slider member from said body to provide a second rocker assembly mode having a second valve lift capability; and c) a return spring, wherein said latch includes a lock pin disposed in said bore and a plug sealingly disposed in said bore to create a hydraulic chamber between said lock pin and said plug, wherein said bore is provided with at least one formed indentation, and wherein said plug in a pre-inserted condition has an outer diameter that is substantially equal to a diameter of said bore, wherein said plug in a deformed condition is deformed radially outward into said at least one formed indentation to anchor said plug in said bore, and wherein said return spring is disposed between said lock pin and said body, wherein said plug is positioned within said bore at a predetermined axial location such that an inner face of said plug provides a predetermined stop for the outward stroke of said lock pin and provides a predetermined compression of said return spring.

11. An internal combustion engine comprising a two-step finger follower rocker arm assembly for variably activating a combustion valve, including a rocker arm body having a bore, and a latch disposed in said bore for selectively latching a slider member to said body to provide a first rocker assembly mode having a first valve lift capability, and for unlatching said slider member from said body to provide a second rocker assembly mode having a second valve lift capability, wherein said latch includes a lock pin disposed in said bore and a plug sealingly disposed in said bore to create a hydraulic chamber between said lock pin and said plug, wherein said bore is provided with at least one formed indentation, and wherein said plug in a pre-inserted condition has an outer diameter that is substantially equal to a diameter of said bore, and wherein said plug in a deformed condition is deformed radially outward relative to said plug in said ore-inserted condition into said at least one formed indentation to anchor said plug in said bore.

12. An internal combustion engine in accordance with claim 11 wherein said plug is deformed into said at least one formed indentation to anchor said plug in a fixed axial position within said bore.

13. A rocker arm assembly in accordance with claim 1 wherein said plug is deformed into said at least one formed indentation to anchor said plug in a fixed axial position within said bore.

* * * * *